(12) United States Patent
Hadar et al.

(10) Patent No.: US 8,484,136 B2
(45) Date of Patent: Jul. 9, 2013

(54) BROKERING AND PAYMENT OPTIMIZATION FOR CLOUD COMPUTING

(75) Inventors: Eitan Hadar, Nesher (IL); Debra Jean Danielson, Somerset, NJ (US)

(73) Assignee: CA, Inc., Islandia, NY (US)

( * ) Notice: Subject to any disclaimer, the term of this patent is extended or adjusted under 35 U.S.C. 154(b) by 502 days.

(21) Appl. No.: 12/767,453

(22) Filed: Apr. 26, 2010

(65) Prior Publication Data

US 2011/0264571 A1  Oct. 27, 2011

(51) Int. Cl.
*G06F 17/00* (2006.01)
*G06G 7/00* (2006.01)
G06Q 30/00 (2012.01)
G07F 19/00 (2006.01)
H04M 15/00 (2006.01)

(52) U.S. Cl.
USPC .......... 705/400; 705/26.4; 705/26.41; 705/34

(58) Field of Classification Search
USPC .................................................. 705/34, 400
See application file for complete search history.

(56) References Cited

U.S. PATENT DOCUMENTS

| | | | |
|---|---|---|---|
| 2002/0062278 A1* | 5/2002 | Ingram et al. ................... | 705/39 |
| 2002/0166117 A1* | 11/2002 | Abrams et al. ................. | 717/177 |
| 2004/0078275 A1* | 4/2004 | Ismert et al. .................... | 705/26 |
| 2004/0125755 A1* | 7/2004 | Roberts .......................... | 370/259 |
| 2009/0100017 A1* | 4/2009 | Graves et al. ..................... | 707/3 |
| 2009/0299920 A1* | 12/2009 | Ferris et al. .................... | 705/418 |
| 2009/0300608 A1* | 12/2009 | Ferris et al. ........................ | 718/1 |
| 2010/0306377 A1* | 12/2010 | DeHaan et al. ................ | 709/226 |
| 2010/0306379 A1* | 12/2010 | Ferris ............................. | 709/226 |
| 2011/0054990 A1* | 3/2011 | Bogdan ...................... | 705/14.17 |
| 2011/0077997 A1* | 3/2011 | Agarwala et al. ............... | 705/10 |
| 2011/0154353 A1* | 6/2011 | Theroux et al. ................ | 718/104 |
| 2011/0238546 A1* | 9/2011 | Certain et al. .................. | 705/34 |

OTHER PUBLICATIONS

Tishlias, Dennis P., How to measure your organization's efficiency, May/Jun. 1992, Nonprofit World, v10n3, pp. 27-31 (Retrieved by Dialog Quicksearch on Feb. 21, 2013).*

\* cited by examiner

*Primary Examiner* — Scott Zare

(74) *Attorney, Agent, or Firm* — Schwegman Lundberg & Woesnner, P.A.

(57) ABSTRACT

A system includes a receiving module to receive a purchase inquiry for a cloud computing service from a consumer in a first currency. A pricing module is used to price-out the cloud computing service from a provider where the cloud computing service is provided in a second currency. A reconciliation module reconciles the purchase of the cloud computing service in the consumer's geographical location and currency with the provider's location and currency.

15 Claims, 6 Drawing Sheets

BROKERING AND PAYMENT OPTIMIZATION FOR CLOUD COMPUTING

TECHNICAL FIELD

The present disclosure relates to a system and method for brokering and payment optimization for cloud computing.

BACKGROUND

Cloud computing services, are typically services offered over a network, such as the internet, to consumers. Cloud computing services are typically supported by a cloud computing environment and managed by a cloud computing provider ("provider"). Consumers of a cloud computing service are often located around the world and may wish to purchase the cloud computing service in their local currency or using a particular payment vehicle, such as a check. Providers may only accept payment in one currency, or may require a particular payment vehicle, such as a VISA™ credit card. If the consumer's currency or payment vehicle is not acceptable to the provider, the transaction cannot be completed and the consumer loses the benefit of the cloud computing service while the provider loses business.

Some providers may attempt to cover a wide variety of currencies and payment methods themselves. Doing so, however, increases the complexity of the provider's business in an area in which the provider is not an expert and may lead to increased costs while still possibly failing to meet the needs of some consumers.

Further, cloud computing services are typically sold in defined units. For example, if the cloud computing service is data storage, the unit may be a 100 gigabytes ("GB") per month. Some consumers plan on consuming less than a multiple of the cloud computing service unit. For example, consumer A may plan on using only 50 GB per month and consumer B may plan on using 40 GB per month. These consumers are faced with over purchasing the cloud computing service to meet their needs, thus wasting the unused portion of the service, or refraining from the purchase altogether.

Some providers may attempt to meet the needs of these lower use consumers by developing custom cloud computing service plans for each low use consumer. This approach, however, may lead to increased transactional and accounting costs while failing to generate more revenue.

SUMMARY

A system includes a receiving module to receive a purchase inquiry for a cloud computing service from a consumer in a first currency. A pricing module is used to price-out the cloud computing service from a provider in a second currency. A reconciliation module reconciles the price of the cloud computing service in the second currency and the purchase inquiry in the first currency. The provider is paid in the second currency and the consumer is charged in the first currency.

A method includes receiving a purchase inquiry for a cloud computing service from a consumer. The purchase inquiry specifying a first currency. Pricing-out the cloud computing service from a provider in accordance with the purchase inquiry. The price for the cloud computing service is provided in a second currency. Reconciling the price of the cloud computing service in the second currency with the purchase inquiry specifying the first currency. Paying the provider in the second currency and charging the consumer in the first currency.

A system includes a receiving module to receive a purchase inquiry for a cloud computing service from each of a first plurality of consumers. The receiving module is used to group a second plurality of consumers from the first plurality of consumers into a consumer block. A usage interface is used to tabulate the actual use of the cloud computing service for each consumer in the consumer block. A reconciliation module is used to charge each consumer in the consumer block for its actual use of the cloud computing service.

A method includes receiving a purchase inquiry for a cloud computing service from each of a first plurality of consumers. Grouping a second plurality of consumers from the first plurality of consumers into a consumer block. Tabulating actual use of the cloud computing service for each consumer in the consumer block. Charging each consumer in the consumer block based on its actual use of the cloud computing service. A machine-readable medium storing instructions that, when executed by a processor, perform this method.

DETAILED DESCRIPTION

Figure 1:
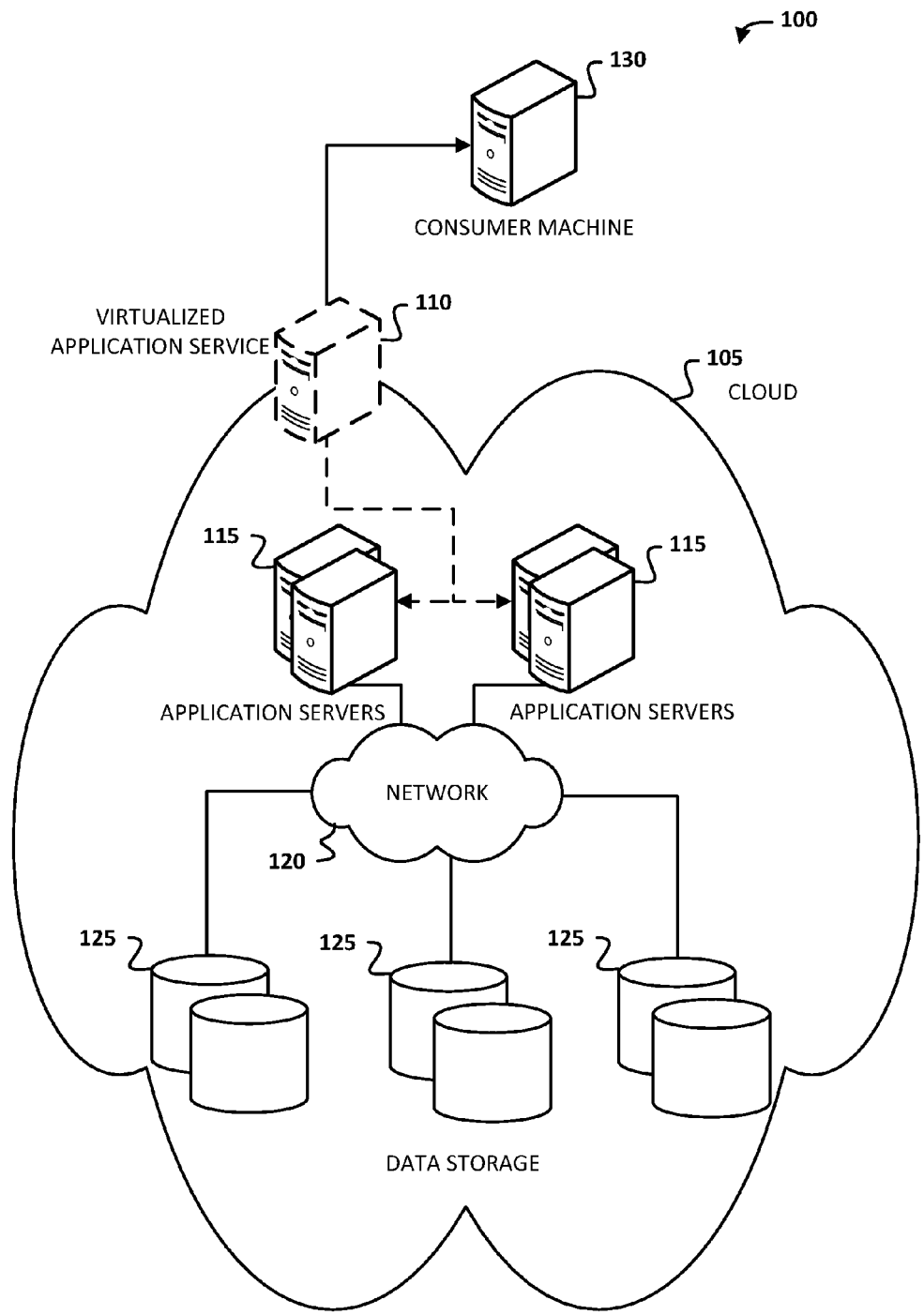
FIG. 1 is a block diagram illustrating an example cloud computing environment.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. Furthermore, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

A number of figures show block diagrams of systems and apparatus of embodiments of the invention. A number of figures show flow diagrams illustrating methods and processes for such embodiments. The operations of the flow diagrams will be described with references to the systems/apparatuses shown in the block diagrams. However, it should be understood that the operations of the flow diagrams could be performed by embodiments of systems and apparatus other than those discussed with reference to the block diagrams, and embodiments discussed with reference to the systems/apparatus could perform operations different than those discussed with reference to the flow diagrams.

FIG. 1 is a block diagram illustrating an example cloud computing environment ("CCE") 100. In some embodiments the CCE 100 includes the cloud 105 and one or more consumer machines 130. In some embodiments the consumer machine 130 is connected to the cloud 105 over a network, such as the internet. In some embodiments the cloud 105 further includes one or more virtualized application services 110 and one or more applications servers 115 connected via a network 120 to, possibly, distributed data storage 125.

An example cloud computing service is storage. In this example, a consumer, through the consumer machine 130, typically stores some of its data in the cloud 105. Usually, the consumer machine 130 interfaces with the cloud through the virtualized application service 110. The virtualized application service 110 provides the consumer machine 130 with the necessary storage interfaces while obfuscating the underlying infrastructure to allow the provider to manage that infrastructure for high-availability, speed, or other factors to efficiently provide the requested service.

The infrastructure may consist of multiple application servers 115 which may ultimately provide the cloud computing service. These application servers 115 may reside in multiple geographical locations to help ensure availability in the case of an event at one of the locations. Parts of the data storage 125 may also reside in multiple geographical locations to mitigate the effects of an event at one of the locations. The application servers 115 may be connected with each other and the data storage 125 via one or more networks 120. The consumer data accepted by the provider may be processed by any of the applications servers 115 in any of the locations that those applications servers 115 reside, and may be stored in any part of the data storage 125 at any location that the part of the data storage 125 resides.

Typically CCEs 100 have many application servers 115 and large amounts of data storage 125. These resources often allow the provider to mitigate the effects of data center events, provide consumers with additional resources during peak processing times, and other options which provide economic advantages over more localized solutions. Accordingly, cloud computing services are often an attractive alternative to consumer ownership and management of the service within its organization.

Figure 2:
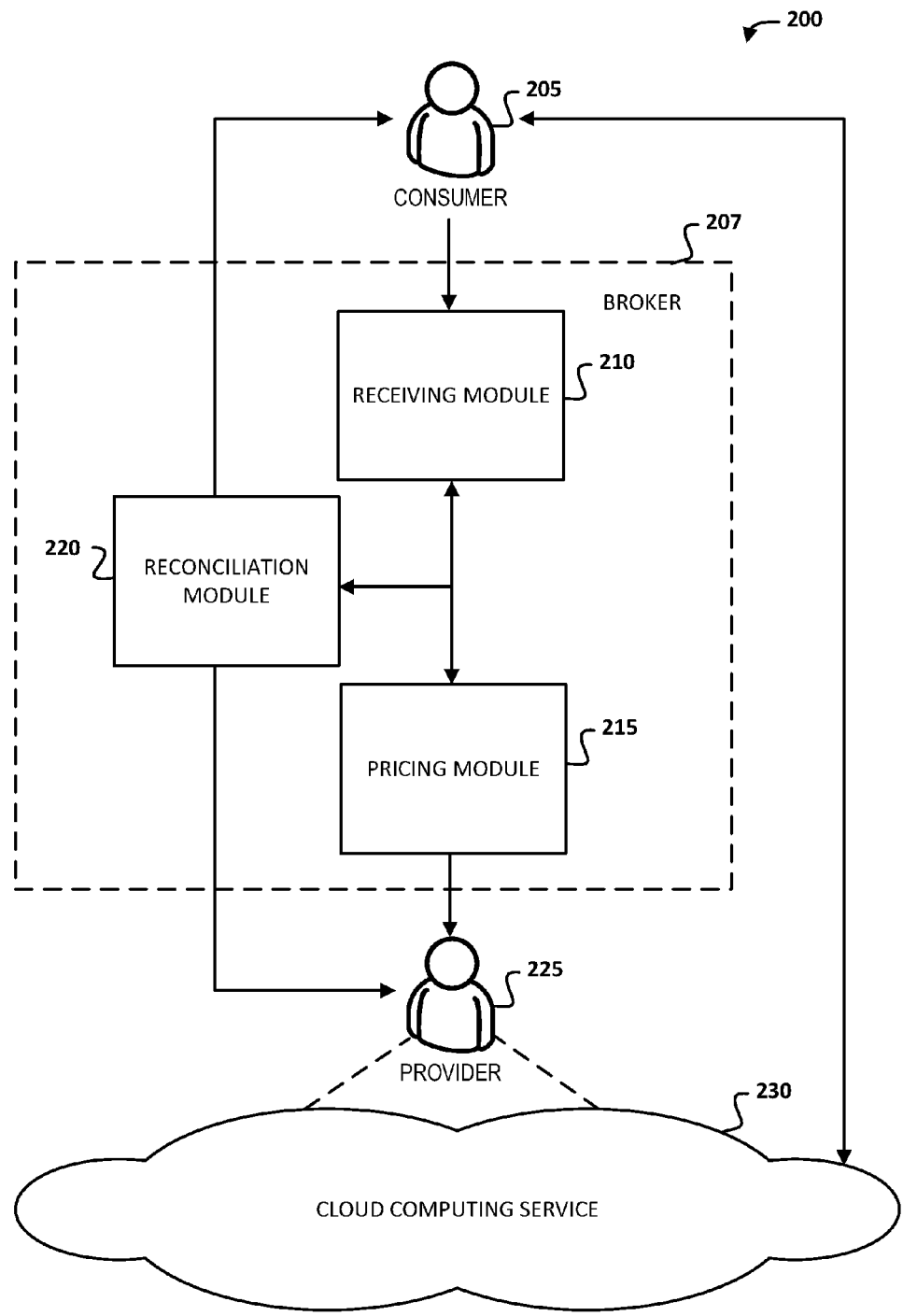
FIG. 2 is a block diagram illustrating an example embodiment of a system for brokering for cloud computing.

FIG. 2 is a block diagram illustrating an example embodiment of a system 200 to provide brokering for cloud computing. The system 200 may include a broker 207 and a cloud computing service 230. The broker 207 may further include a receiving module 210, a pricing module 215, and a reconciliation module 220. The receiving module 210, the pricing module 215, and the reconciliation module 220 may be coupled to each other to exchange information and perform various services.

The receiving module 210, in one embodiment, is configured to receive a purchase inquiry from a consumer 205. In some embodiments the purchase inquiry is any communication indicating the cloud computing service desired by the consumer 205. After the purchase inquiry is received, the pricing module 215 may price-out the cloud computing service 230, specified in the purchase inquiry, from the provider 225. For example, receiving module 210 may receive a consumer 205 order for twenty-five cloud based email accounts (the cloud computing service 230) and specify that the order will be paid in Norwegian kroners using a check. The pricing module 215 may then contact the provider 225 in the U.S. and determine that the price of the email accounts 230 is twenty U.S. dollars per month.

The reconciliation module 220 is configured to reconcile differences between the consumer 205 purchase inquiry and the provider's 225 purchase conditions for the cloud computing service 230. Continuing the previous example, the reconciliation module 220 may determine the exchange rate between Norwegian kroners and U.S. dollars. In some embodiments the reconciliation module 220 may also determine a mechanism to charge the consumer 205 using its preferred transaction vehicle and pay the provider 225 using its preferred transaction vehicle. In some embodiments the reconciliation module 220 may interface with banks or other processors to facilitate the transaction with the consumer 205, the provider 225, or both. In other embodiments the reconciliation module 220 may process part, or all, of the transaction itself.

After the consumer 205 has paid for the cloud computing service 230 and the provider 225 has received the payment, the consumer 205 may then connect to the cloud computing service 230 and begin utilizing it. In some embodiments the broker 207 may continue to mediate between the consumer 205 and the provider 225 while the consumer 205 utilizes the cloud computing service 230, e.g., to reconcile future monthly transactions to maintain the cloud computing service 230.

Thus, the financial component of the transaction between the consumer 205 and the provider 225 is abstracted by the broker 207. In some embodiments the broker 207 may facilitate resale of the cloud computing service 230 without impacting the transaction from the provider's 225 perspective. Abstracting the financial transaction may reduce provider 225 processing costs by allowing the provider 225 to sell its services to many different consumers 205 without the expense of supporting the myriad of currencies and transaction vehicles consumers 205 may wish to use.

Figure 3:
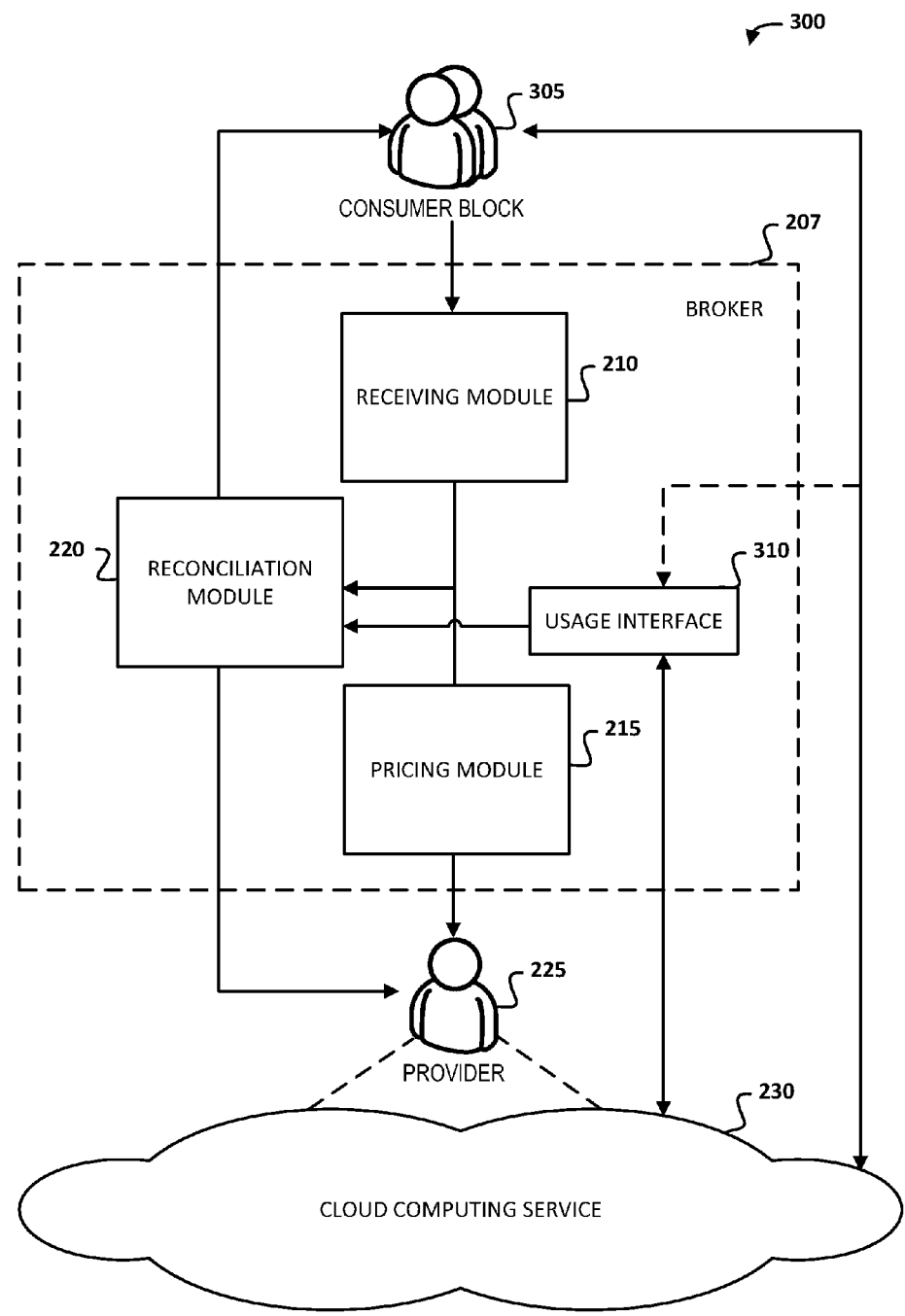
FIG. 3 is a block diagram illustrating an example embodiment of a system to provide payment optimization for cloud computing.

FIG. 3 is a block diagram illustrating an example embodiment of a system 300 to provide payment optimization for cloud computing. The system 300 may include the elements of system 200 (see FIG. 2), with the broker 207 additionally including a usage interface 310. In some embodiments the usage interface 310 may be coupled to the reconciliation module 220 and to the cloud computing service 230.

The receiving module 210 may receive purchase inquiries from multiple consumers 205 for the same computing service 230. In some embodiments the receiving module 210 may be configured to group a subset of the multiple consumers 205 into one or more consumer blocks 305. In some embodiments the grouping may be based on a determination of the consumers' 205 planned resource needs such that the consumer block 305 resource needs approach a multiple of a unit of the provider's 225 cloud computing service 230 to reduce over head costs. In other embodiments the grouping may be based on convenience or efficiency in processing the consumer block 305 members based on consumer 205 currencies, transaction vehicles, or other factors.

In some embodiments the usage interface 310 is coupled to the cloud computing service 230 and has access to consumer 205 usage information in order to tabulate the actual use of the cloud computing service 230 by each consumer 205 in the consumer block 305. In some embodiments the usage interface 310 wraps the cloud computing service 230, shown on FIG. 3 as the dashed line branching from the consumer block 305 connection to the cloud computing service 230 and connecting to the usage interface 310. In this scenario, the usage interface 310 may be configured to provide an interface to the cloud computing service 230 through which consumer 205 use of the cloud computing service 230 is directed. For example, a consumer 205 of the data storage cloud computing service 230 may connect to the usage interface 310 instead of directly to the cloud computing resource 230, and then the usage interface 310 connects to the data storage cloud computing service 230. In some embodiments the tabulations are sent to the reconciliation module 220.

In some embodiments the reconciliation module 220 is configured to receive the tabulations and calculate consumer 205 charges, for consumers 205 in the consumer block 305, based on the actual use of the cloud computing service 230. In some embodiments the charges may include processing, or other, fees.

In some cases the actual use of the cloud computing service 230 may not be a multiple of the units in which the cloud computing service 230 may be purchased. For example, if the cloud computing service 230 is data storage and it is sold in 100 GB per month units and the consumer block 305 includes consumer A, who used 40 GB in the month, and consumer B, who used 20 GB in the month, then 40 GB of the cloud computing service 230 unit went unused creating an overhead cost. The reconciliation module 220 may be configured to calculate a prorated obligation for each consumer 205 based on the consumer's 205 actual use of the cloud computing service 230. For example, if the data storage cloud computing service 230 costs $100, then each GB per month may cost $1. Thus the 40 GB overhead will cost $40. Of the 60 GB consumed, consumer A used two-thirds and consumer B used one-third. Accordingly, consumer A may be responsible for two-thirds of the $40 overhead, or approximately $26.67, and consumer B may be responsible for one-third, or approximately $13.33.

In some embodiments systems 200 and 300 may be combined in whole or part. In some embodiments systems 200 and 300 may be external to the cloud 105. In other embodiments systems 200 and 300 may be integrated into the cloud 105. In still other embodiments elements of systems 200 and 300 may be in the cloud while others are not.

Figure 4:
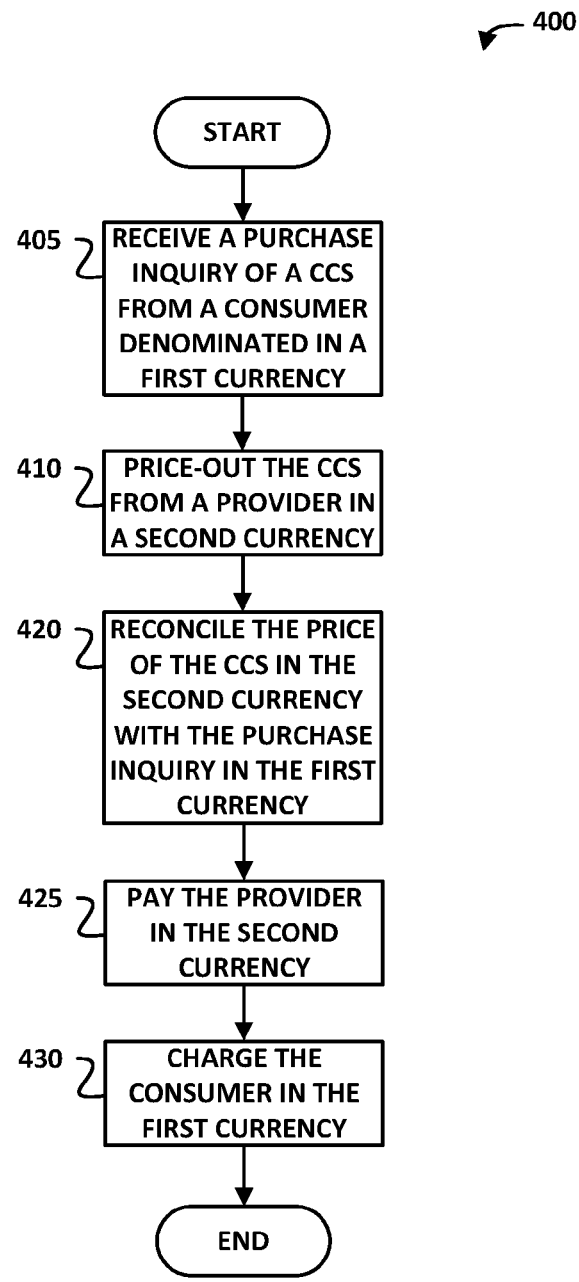
FIG. 4 is a flowchart illustrating an example embodiment of a method to provide brokering for cloud computing.

FIG. 4 is a flowchart illustrating an example embodiment of a method 400 to provide brokering for cloud computing. In some embodiments the method 400 may be performed on system 200, system 300, or both. In other embodiments the method 400 may be performed in alternative systems.

At 405 a purchase inquiry for a cloud computing service ("CCS") 230 is received, for example, by the receiving module 210 from a consumer 205. The purchase inquiry may specify a first currency in which the transaction is to be completed. For example, the purchase inquiry may specify that the transaction is to be completed in Norwegian kroners. The purchase inquiry may further specify a transaction vehicle in which the transaction is to be completed, e.g., cash. In some embodiments the purchase inquiry may include a list of currencies or transaction vehicles that are acceptable to the consumer 205.

At 410 a provider 225 is contacted and the CCS 230 is priced-out by, for example, the pricing module 215. The pricing module 215 may determine a second currency specified by the provider 225 to purchase the CCS 230, e.g., U.S. dollars. In some embodiments the pricing module 215 may further determine the transaction vehicle specified by the provider 225 to purchase the CCS 230, e.g., a credit card. In some embodiments the pricing module 215 may determine a list of currencies and transaction vehicles that are acceptable to the provider 225 to purchase the CCS 230.

At 420 the first currency and second currencies may be reconciled by, for example, the reconciliation module 220. For example, an exchange rate between the first currency of Norwegian kroners and the second currency of U.S. dollars may be determined to calculate the price of the CCS 230 in the first currency. In some embodiments the reconciliation module 220 may determine a mechanism to reconcile between different transaction vehicles specified in the purchase inquiry and by the provider 225. In some embodiments the price may include fees associated with the currency exchange, transactional vehicle reconciliation, or other aspects of the transaction.

At 425 the provider 225 may be paid in the second currency by, for example, the reconciliation module 220. In some embodiments the provider 225 may be paid in one or more of a number of currencies specified when the CCS 230 was priced out at 410. In some embodiments the provider 225 is paid using the transaction vehicle specified at 410. In other embodiments the provider 225 is paid using one or more of a number of transaction vehicles specified at 410.

At 430 the consumer 205 may be charged in the first currency by, for example, the reconciliation module 220. In some embodiments the consumer 205 may be charged in one or more of a number of currencies specified in the purchase inquiry received at 405. In some embodiments the consumer 205 is charged using the transaction vehicle specified at 405. In other embodiments the consumer 205 is charged using one or more of a number of transaction vehicles specified at 405.

Utilizing method 400 frees the provider 225 from managing a business ancillary to its mission of providing cloud computing services 230, namely supporting financial transactions to consumers 205 using a myriad of currencies or transaction vehicles. Accordingly, the provider 225 may realize cost efficiencies while expanding its market and consumers 205 may have greater choice in cloud computing services 230 and providers 225.

Figure 5:
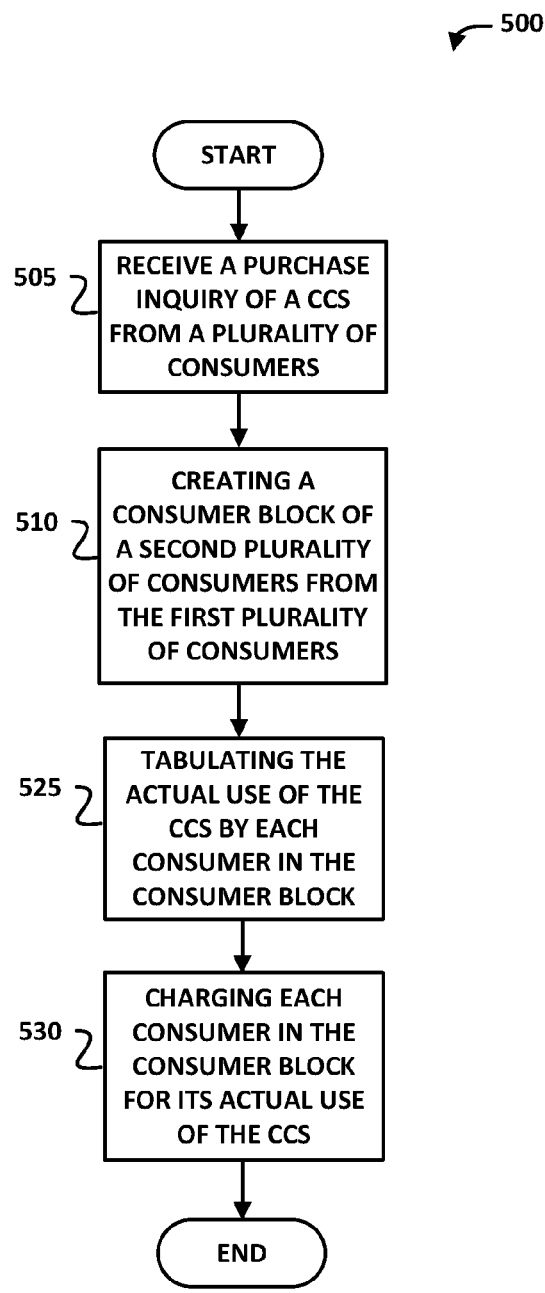
FIG. 5 is a flowchart illustrating an example embodiment of a method to provide payment optimization for cloud computing.

FIG. 5 is a flowchart of an example method 500 to provide payment optimization for cloud computing. In some embodiments the method 400 may be performed on system 200, system 300, or both. In other embodiments the method 400 may be performed in alternative systems.

At 505 purchase inquiries are received from a plurality of consumers 205 for a CCS 230 by, for example, the receiving module 210. In some embodiments the purchase inquiries may specify currencies or transactional vehicles as discussed with respect to method 400.

At 510 a subset of the consumers 205 submitting purchase inquiries may be grouped in to a consumer block 305 by, for example, the receiving module 210. In some embodiments the grouping may be based on matching the amount of the CCS 230 expected to be used by the consumer block 305 to approach a multiple of a unit of the CCS 230 sold by the provider 225. In other embodiments the grouping may be based on efficiency factors associated with the consumer 205 currency or transactional vehicle preferences, or other factors. The CCS 230 may then be purchased on behalf of the consumer block 305 by, for example, the broker 207.

At 525 the actual use of the CCS 230 by each consumer 205 in the consumer block 305 may be tabulated by, for example, the usage interface 310. For example, if the CCS 230 is data storage, then the usage interface 310 may determine that, in a given month, consumer A from the consumer block 305 used 40 GB and consumer B used 20 GB. In some embodiments consumers 205 in the consumer block 305 may connect directly to the CCS 230 and the usage interface 310 may communicate with the CCS 230 to determine consumer 205 usage. In other embodiments consumers 205 in the consumer block 305 may connect to the CCS 230 through the usage interface 310, the usage interface 310 wrapping the CCS 230, allowing the usage interface 310 to tabulate actual consumer 205 usage of the CCS 230 directly. In some embodiments the tabulation of actual consumer 205 use of the CCS 230 may be forwarded on to the reconciliation module 220.

At 530 the consumers 205 in the consumer block 305 are charged based on each consumer's 205 actual use of the CCS 230. The determination of each consumer's 205 obligation may be determined, for example, by the reconciliation module 220, the usage interface 310, or some other calculator. For example, if the CCS 230 is a web hosting service and it is sold in units of 100 page views per month for $100, and consumer A and B from the consumer block 305 respectively consume 10 and 20 page views in a given month, then they may be charged $10 and $20 respectively. In some embodiments the charges may include processing, or other, fees.

If the actual use of the CCS 230 by the consumer block 305 is not a multiple of the units the CCS 230 is sold in, an overhead is created, i.e., payment may be required for the unused portion of the unit. For example, using the previous example, the CCS 230 may cost $100 per month to meet the needs of consumers A and B. Because consumers A and B used only $30 of the service, there is a $70 overhead. In some embodiments the overhead may be prorated between the consumers 205 in the consumer block 305 based on each consumer's 205 actual use of the CCS 230. Again, using the previous example, of the total use, consumer A used two-thirds of the service and consumer B used one-third. Thus, consumer A may be charged for two-thirds of the $70, or approximately $46.67, and consumer B may be charged for one-third of the $70 overhead, or approximately $23.33.

Grouping some consumers 205 into consumer blocks 305 may increase provider 225 efficiency by reducing the number of products, service plans, and management to meet these consumers' 205 needs. It may also allow consumers 205 to purchase the cloud computing service 230 from the provider 225 who may not have been previously able to afford the cloud computing service 230. Further, consumers 205 who previously would have purchased the cloud computing service 230 may pay less due to unit splitting and division of the overhead costs, thus making the cloud computing service 230 more attractive in the market place.

In some embodiments methods 400 and 500 may be combined to increase provider 205 flexibility in meeting the currency, transactional vehicle, and usage needs of possible consumers 205 while reducing provider 225 side complexity and costs. Accordingly, providers 225 may focus on their core business while reaching the maximum number of consumers 205.

Figure 6:
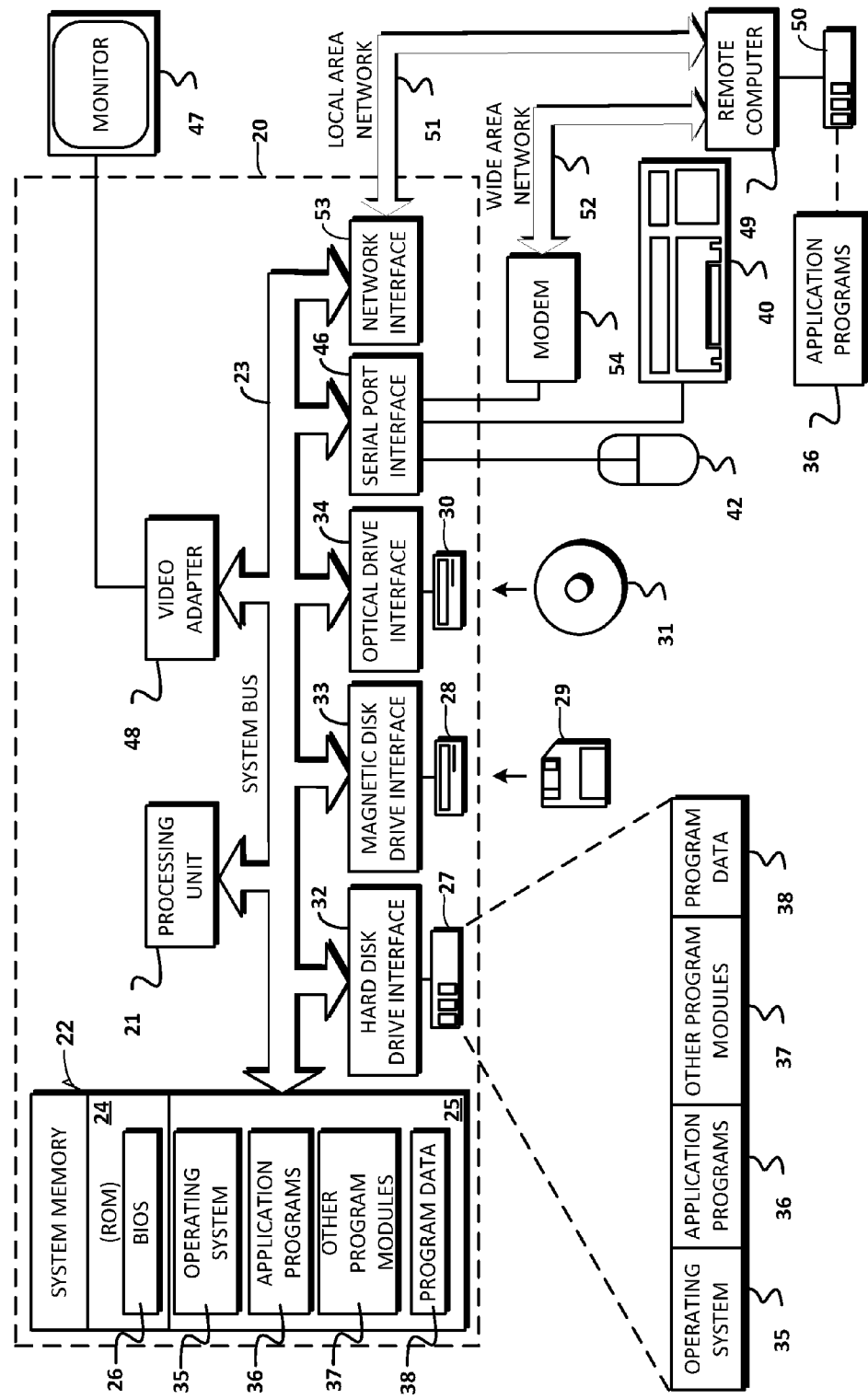
FIG. 6 is a block diagram illustrating an example embodiment of a computer system upon which one or more embodiments of the present disclosure may execute.

FIG. 6 is an overview diagram of a hardware and operating environment in conjunction with which embodiments of the invention may be practiced. The description of FIG. 6 is intended to provide a brief, general description of suitable computer hardware and a suitable computing environment in conjunction with which the invention may be implemented. In some embodiments, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computer environments where tasks are performed by I/0 remote processing devices that are linked through a communications network. In a distributed computing environment, program modules may be located in both local and remote memory storage devices.

In the embodiment shown in FIG. 6, a hardware and operating environment is provided that is applicable to any of the servers and/or remote clients shown in the other Figures.

As shown in FIG. 6, one embodiment of the hardware and operating environment includes a general purpose computing device in the form of a computer 20 (e.g., a personal computer, workstation, or server), including one or more processing units 21, a system memory 22, and a system bus 23 that operatively couples various system components including the system memory 22 to the processing unit 21. There may be only one or there may be more than one processing unit 21, such that the processor of computer 20 comprises a single central-processing unit (CPU), or a plurality of processing units, commonly referred to as a multiprocessor or parallel-processor environment. In various embodiments, computer 20 is a conventional computer, a distributed computer, or any other type of computer.

The system bus 23 can be any of several types of bus structures including a memory bus or memory controller, a peripheral bus, and a local bus using any of a variety of bus architectures. The system memory can also be referred to as simply the memory, and, in some embodiments, includes read-only memory (ROM) 24 and random-access memory (RAM) 25. A basic input/output system (BIOS) program 26, containing the basic routines that help to transfer information between elements within the computer 20, such as during start-up, may be stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 couple with a hard disk drive interface 32, a magnetic disk drive interface 33, and an optical disk drive interface 34, respectively. The drives and their associated computer-readable media provide non volatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 29, optical disk 31, ROM 24, or RAM 25, including an operating system 35, one or more application programs 36, other program modules 37, and program data 38. A plug in containing a security transmission engine for the present invention can be resident on any one or number of these computer-readable media.

A user may enter commands and information into computer 20 through input devices such as a keyboard 40 and pointing device 42. Other input devices (not shown) can include a microphone, joystick, game pad, satellite dish, scanner, or the like. These other input devices are often connected to the processing unit 21 through a serial port interface 46 that is coupled to the system bus 23, but can be connected by other interfaces, such as a parallel port, game port, or a universal serial bus (USB). A monitor 47 or other type of display device can also be connected to the system bus 23 via an interface, such as a video adapter 48. The monitor 40 can display a graphical user interface for the user. In addition to the monitor 40, computers typically include other peripheral output devices (not shown), such as speakers and printers.

The computer 20 may operate in a networked environment using logical connections to one or more remote computers or servers, such as remote computer 49. These logical connections are achieved by a communication device coupled to or a part of the computer 20; the invention is not limited to a particular type of communications device. The remote computer 49 can be another computer, a server, a router, a network PC, a client, a peer device or other common network node, and typically includes many or all of the elements described above I/O relative to the computer 20, although only a memory storage device 50 has been illustrated. The logical connections depicted in FIG. 6 include a local area network (LAN) 51 and/or a wide area network (WAN) 52. Such networking environments are commonplace in office networks, enterprise-wide computer networks, intranets and the internet, which are all types of networks.

When used in a LAN-networking environment, the computer 20 is connected to the LAN 51 through a network interface or adapter 53, which is one type of communications device. In some embodiments, when used in a WAN-networking environment, the computer 20 typically includes a modem 54 (another type of communications device) or any other type of communications device, e.g., a wireless transceiver, for establishing communications over the wide-area network 52, such as the internet. The modem 54, which may be internal or external, is connected to the system bus 23 via the serial port interface 46. In a networked environment, program modules depicted relative to the computer 20 can be stored in the remote memory storage device 50 of remote computer, or server 49. It is appreciated that the network connections shown are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

Embodiments of the invention include features, methods or processes embodied within machine-executable instructions provided by a machine-readable medium. A machine-readable medium includes any mechanism which provides (i.e., stores) information in a form accessible by a machine (e.g., a computer, a network device, a personal digital assistant, manufacturing tool, any device with a set of one or more processors, etc.). In an exemplary embodiment, a machine-readable medium includes volatile and/or non-volatile media (e.g., read only memory (ROM), random access memory (RAM), magnetic disk storage media, optical storage media, flash memory devices, etc.), as well as electrical, optical, acoustical or other form of propagated signals (e.g., carrier waves, infrared signals, digital signals, etc.). Consequently, a machine-readable medium can be either tangible or intangible in nature.

In one embodiment, the term "machine-readable medium" or "computer-readable medium" shall be taken to include any tangible non-transitory medium which is capable of storing or encoding a sequence of instructions for execution by the machine and that causes the machine to perform any one of the methodologies. In a second embodiment separate from the first embodiment, the term "machine-readable medium" or "computer-readable medium" shall be taken to include any intangible transitory medium which is capable of storing or encoding a sequence of instructions for execution by the machine and that causes the machine to perform any one of the methodologies. Consequently, a machine-readable medium can be either tangible or intangible in nature.

Such instructions are utilized to cause a general or special purpose processor, programmed with the instructions, to perform methods or processes of the embodiments of the invention. Alternatively, the features or operations of embodiments of the invention may be performed by specific hardware components which contain hard-wired logic for performing the operations, or by any combination of programmed data processing components and specific hardware components. Embodiments of the invention include digital/analog signal processing systems, software, data processing hardware, data processing system-implemented methods, and various processing operations, further described herein.

Thus, an example system, method and machine readable medium for brokering and payment optimization for cloud computing has been described. Although specific example embodiments have been described, it will be evident that various modifications and changes may be made to these embodiments without departing from the broader scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate example embodiment.

What is claimed is:

1. A method comprising:
  receiving a purchase inquiry for a cloud computing service from each of a first plurality of consumers;

grouping a second plurality of consumers from the first plurality of consumers into a consumer block;

purchasing a quantity of the cloud computing service, the quantity of the cloud of computing service reserved for use for the second plurality of consumers grouped into the consumer block;

tabulating, using a first data processor configured by a usage interface, actual use of the cloud computing service for each consumer in the consumer block using a usage interface; and charging, using a second data processor configured by a charging module, each consumer in the consumer block based on its actual use of the cloud computing service, wherein the charging includes using the second data processor to divide an overhead cost among the consumers in the consumer block based on each consumer in the consumer block's actual use of the cloud computing service, the overhead cost being a value of an unused portion of the purchased quantity of the cloud computing service.

2. The method of claim 1, wherein the usage interface wraps the cloud computing service.

3. The method of claim 1, wherein the charging includes a chargeback for underuse by a consumer in the consumer block.

4. The method of claim 1, further comprising reconciling between payment from a consumer in a first currency and payment to the provider in a second currency, where the consumer is in the consumer block.

5. The method of claim 4, wherein the payment from the consumer uses a first transaction vehicle and the payment to the provider uses a second transaction vehicle, the second transaction vehicle being a transaction vehicle accepted by the provider and the first transaction vehicle being a transaction vehicle not accepted by the provider; and wherein the reconciling includes mediating between the first transaction vehicle and the second transaction vehicle.

6. A system comprising:
a first data processor;
a second data processor;
a third data processor;
a receiving module to configure the first data processor to receive a purchase inquiry for a cloud computing service from each of a first plurality of consumers, to group a second plurality of consumers from the first plurality of consumers into a consumer block, and to purchase a quantity of the cloud computing service, the quantity of the cloud of computing service reserved for use for the second plurality of consumers grouped into the consumer block;
a usage interface configure the second data processor to tabulate the actual use of the cloud computing service for each consumer in the consumer block; and
a reconciliation module to configure the third data processor to charge each consumer in the consumer block for its actual use of the cloud computing service, wherein the reconciliation module is configured to divide an overhead cost among the consumers in the consumer block based on each consumer in the consumer block's actual use of the cloud computing service, the overhead cost being a value of an unused portion of the purchased quantity of the cloud computing service.

7. The system of claim 6, wherein the usage interface wraps the cloud computing service.

8. The system of claim 6, wherein the reconciliation module is configured to chargeback for underuse by a consumer in the consumer block.

9. The system of claim 6, wherein the reconciliation module is configured to reconcile between payment from a consumer in a first currency and payment to the provider in a second currency, where the consumer is in the consumer block.

10. The system of claim 9, wherein the payment from the consumer uses a first transaction vehicle and the payment to the provider uses a second transaction vehicle, the second transaction vehicle being a transaction vehicle accepted by the provider and the first transaction vehicle being a transaction vehicle not accepted by the provider; and wherein the reconciliation module is further configured to mediate between the first transaction vehicle and the second transaction vehicle.

11. A machine-readable medium that is not a transitory propagating signal, the machine-readable medium storing instructions that, when executed by at least one processor, cause the at least one processor to perform the following actions:

receiving a purchase inquiry for a cloud computing service from each of a first plurality of consumers;

grouping a second plurality of consumers from the first plurality of consumers into a consumer block;

purchasing a quantity of the cloud computing service, the quantity of the cloud of computing service reserved for use for the second plurality of consumers grouped into the consumer block;

tabulating, using a data processor, the actual use of the cloud computing service for each consumer in the consumer block using the usage interface; and charging each consumer in the consumer block for its actual use of the cloud computing service, wherein the charging includes dividing an overhead cost among the consumers in the consumer block based on each consumer in the consumer block's actual use of the cloud computing service, the overhead cost being a value of an unused portion of the purchased quantity of the cloud computing service.

12. The machine-readable medium of claim 11, wherein the usage interface wraps the cloud computing service.

13. The machine-readable medium of claim 11, wherein the charging includes a chargeback for underuse by a consumer in the consumer block.

14. The machine-readable medium of claim 11, further comprising reconciling between payment from a consumer in a first currency and payment to the provider in a second currency, where the consumer is in the consumer block.

15. The machine-readable medium of claim 14, wherein the payment from the consumer uses a first transaction vehicle and the payment to the provider uses a second transaction vehicle, the second transaction vehicle being a transaction vehicle accepted by the provider and the first transaction vehicle being a transaction vehicle not accepted by the provider; and wherein the reconciling includes mediating between the first transaction vehicle and the second transaction vehicle.

* * * * *